United States Patent [19]

Georges et al.

[11] Patent Number: 5,364,723

[45] Date of Patent: Nov. 15, 1994

[54] TONER COMPOSITIONS WITH STYRENE TERPENE RESINS

[75] Inventors: Michael K. Georges, Guelph; Nancy A. Listigovers, Oakville; Stephan V. Drappel, Toronto; Maria V. McDougall, Burlington; Gerald R. Allison, Oakville, all of Canada

[73] Assignee: Xerox Corporation, Stamford, Conn.

[21] Appl. No.: 961,961

[22] Filed: Oct. 16, 1992

[51] Int. Cl.$^5$ ............................................. G03G 9/00
[52] U.S. Cl. ................................ 430/110; 430/109; 430/137; 525/314
[58] Field of Search ..................... 430/109, 110, 137; 525/314

[56] References Cited

U.S. PATENT DOCUMENTS

| | | | |
|---|---|---|---|
| 2,940,934 | 6/1960 | Carlson | 252/62.1 |
| 2,986,521 | 5/1961 | Wielicki | 252/62.1 |
| 3,041,169 | 6/1962 | Wielicki | 96/1 |
| 3,060,019 | 10/1962 | Johnson et al. | 96/1 |
| 3,510,338 | 5/1970 | Varron | 117/17.5 |
| 3,965,022 | 6/1976 | Strong et al. | 252/62.1 |
| 4,374,957 | 2/1983 | Quirk | 525/314 |
| 5,168,028 | 12/1992 | Nanya et al. | 430/109 |

OTHER PUBLICATIONS

Abate, Diane Wolfer and Stevens, Malcolm P., "Unsaturated Polyester Containing Myrcene-Maleic Anhydride Diols-A'lder Adduct", *Journal of Applied Polymer Science*, vol. 46, pp. 389-391.

Chemical Abstract Search (cited to show similar copolymers of styrene & terpene).

*Primary Examiner*—Steve Rosasco
*Attorney, Agent, or Firm*—John L. Haack

[57] ABSTRACT

Disclosed is a toner composition comprised of pigment particles and monovinyl aromatic terpene copolymer resin particles, and more specifically styrene terpene copolymer resins.

21 Claims, No Drawings

TONER COMPOSITIONS WITH STYRENE TERPENE RESINS

BACKGROUND OF THE INVENTION

The invention is generally directed to toner and developer compositions, and more specifically, the present invention is directed to developer and toner compositions containing styrene based copolymers wherein one of the components is a terpene, such as myrcene, and optional charge enhancing additives, which impart or assist in imparting a positive or negative charge to the toner resin particles and enable toners with rapid admix characteristics. In one embodiment, there are provided in accordance with the present invention toner compositions comprised of styrene terpene resin particles, pigment particles, and optional charge additives, such as quaternary ammonium bisulfates, including distearyl methyl hydrogen ammonium bisulfate. In one embodiment, the present invention is directed to toners with charge additives of tetraalkylammonium sulfonates such as dimethyl distearyl ammonium alkyl, or perfluoroalkyl sulfonates. The aforementioned toners in embodiments of the present invention enable, for example, toners with desirable melting characteristics, such as minimum fixing temperatures of between 120° C. and 155° C. with rapid admix of less than about 15 seconds, extended developer life, stable electrical properties, high image print quality with substantially no background deposits, and compatibility with fuser rolls including Viton fuser rolls. Other advantages of the toners of the present invention in embodiments as compared to toners with styrenemethacrylate include superior vinyl offset properties, and relative to styrene/butadiene toners improved brittleness properties, for example, the toners of the present invention in embodiments are less brittle at number average molecular weights ($M_w$) of 50,000 to 60,000 and thus can provide improved results in the the known crease test. The crease test is a method by which the minimum fix temperature of a toner is determined. The toner is applied to paper, fused and then creased with a given load. The thickness of the resulting crease determines the minimum fix temperature of the toner. Other advantages of the toners of the present invention compared to toners of styrene-butadiene in embodiments include ease of preparation of the bulk resin used to prepare the toner compositions. The butadiene monomer is a toxic volatile gas which requires special procedures and equipment for its handling. Terpenes and related monomers are relatively non-toxic liquids that may be obtained from natural renewable nonpetroleum sources as described in, for example, the *Journal of Applied Polymer Science*, Vol. 46, p. 389, 1992. For example, myrcene of the formula $CH_2=CH-C(=CH_2)-CH_2CH_2CH=C(CH_3)_2$, may be obtained from turpentine which in turn is obtained from sulfite wood-pulping processes. Also, the aforementioned toner compositions usually contain pigment particles comprised of, for example, carbon black, magnetites, or mixtures thereof, cyan, magenta, yellow, blue, green, red, or brown components, or mixtures thereof thereby providing for the development and generation of black and/or colored images. The toner and developer compositions of the present invention can be selected for electrophotographic, especially xerographic imaging and printing processes, including color processes.

Toner compositions with styrene resins, like styrene methacrylates, styrene acrylates, styrene butadienes and charge enhancing additives, which impart a positive charge to the toner resin, are known. Thus, for example, there is described in U.S. Pat. No. 3,893,935 the use of quaternary ammonium salts as charge control agents for electrostatic toner compositions the disclosure of which is totally incorporated by reference. There are also described in U.S. Pat. No. 2,986,521 reversal developer compositions comprised of toner resin particles coated with finely divided colloidal silica. According to the disclosure of this patent, the development of electrostatic latent images on negatively charged surfaces is accomplished by applying a developer composition having a positively charged triboelectric relationship with respect to the colloidal silica.

Also, there is disclosed in U.S. Pat. No. 4,338,390, the disclosure of which is totally incorporated herein by reference, toner compositions containing styrene methacrylate, styrene acrylate and the like resins, and as charge enhancing additives organic sulfate and sulfonates, which additives can impart a positive charge to the toner composition. Further, there is disclosed in U.S. Pat. No. 4,298,672, the disclosure of which is totally incorporated herein by reference, positively charged toner compositions with resin particles of, for example, styrene methacrylate, and pigment particles, and as charge enhancing additives alkyl pyridinium compounds. Additionally, other documents disclosing positively charged toner compositions with, for example, styrene methacrylates, and charge control additives include U.S. Pat. Nos. 3,944,493; 4,007,293; 4,079,014 4,394,430, and 4,560,635 which illustrates a toner with a distearyl dimethyl ammonium methyl sulfate charge additive.

Moreover, toner compositions with negative charge enhancing additives are known, reference, for example, U.S. Pat. Nos. 4,411,974 and 4,206,064, the disclosures of which are totally incorporated herein by reference. The '974 patent discloses negatively charged toner compositions comprised of resin particles of, for example, styrene methacrylates, pigment particles, and as a charge enhancing additive ortho-halo phenyl carboxylic acids, Similarly, there are disclosed in the '064 patent toner compositions with chromium, cobalt, and nickel complexes of salicylic acid as negative charge enhancing additives.

In a patentability search there was noted the following patents, 2,986,521, 3,041,169, 3,060,019, 3,510,338, and 3,965,022, which disclose terpene homopolymers and blends of terpene homopolymers with other polymers or copolymers to formulate toner resins and developer compositions thereof. Carlson in U.S. Pat. No. 2,940,934 generally discloses copolymers of styrenes (col 3 line 6) and blends of styrene, polymers and other homopolymers, including terpene homopolymers (reference col. 6, line 6).

SUMMARY OF THE INVENTION

It is an object of the present invention to provide toner and developer compositions with many of the advantages illustrated herein.

In another object of the present invention there are provided positively and negatively charged toner compositions useful for the development of electrostatic latent images including color images.

In yet another object of the present invention, there are provided low melting toner compositions with styrene terpene copolymer resins.

In yet another object of the present invention, there are provided positively charged toner compositions containing tetraalkylammonium sulfonates, such as dimethyl distearyl ammonium sulfonate charge enhancing additives In yet another object of the present invention, there are provided negatively charged toner compositions containing metal azo dye complexes and organoaluminum salts charge enhancing additives Another object of the present invention resides in providing toner compositions with a copolymer of styrene and myrcene, a monoterpene.

In yet a further object of the present invention, there are provided humidity insensitive, from about, for example, 20 to 80 percent relative humidity at temperatures of from 60° to 80° F. as determined in a relative humidity testing chamber, toner compositions with desirable admix properties of 5 seconds to 60 seconds as determined by the charge spectrograph, and preferably less than 15 seconds, for example, and more preferably from about 1 to about 14 seconds, and acceptable triboelectric charging characteristics of from about 10 to about 40 microcoulombs per gram of toners which will enable the development of images in electrophotographic imaging apparatuses, which images have substantially no background deposits thereon, are substantially smudge proof or smudge resistant, and therefore are of excellent resolution; and further, such toner compositions can be selected for high speed electrophotographic apparatuses, that is those exceeding 70 copies per minute.

These and other objects of the present invention can be accomplished in embodiments thereof by providing toner compositions comprised of monovinyl aromatic terpene resin particles, and pigment particles. More specifically, the present invention in one embodiment is directed to toner compositions comprised of monovinyl aromatic terpene copolymer resin particles, pigment, or dye, and optional known charge additives, such as trialkyl, wherein alkyl, for example, contains from 1 to about 30 carbon atoms, hydrogen ammonium bisulfate charge enhancing additives such as distearyl methyl hydrogen ammonium bisulfate, trimethyl hydrogen ammonium bisulfate, triethyl hydrogen ammonium bisulfate, tributyl hydrogen ammonium bisulfate, didodecyl methyl hydrogen ammonium bisulfate, dihexadecyl methyl hydrogen ammonium bisulfate, and preferably distearyl methyl hydrogen ammonium bisulfate in an embodiment of the present invention. Examples of alkyl groups include methyl, ethyl, propyl, butyl, pentyl, hexyl, heptyl, octyl, nonyl, decyl, stearyl, and the like. The aforementioned charge additives can be incorporated into the toner, may be present on the toner surface or may be present on toner surface additives such as colloidal silica particles.

Examples of monovinyl aromatic terpene copolymer resins and particular styrene terpene copolymers of the instant invention include styrene-myrcene, styrene-alpha-pinene, styrene-ocimene, and styrenecarvone synthesized by known free radical or anionic polymerization and related processes. The selection of the polymerization reaction conditions depends upon the structure and reactivity of the monovinyl aromatic and terpene monomers chosen and considerations given to possible regio isomers resulting from, for example, anionic polymerization of terpenes containing 1,3-diene structural units, an example of which is myrcene, $CH_2=CH-C(=CH_2)-CH_2CH_2CH=C(CH_3)_2$.

Subsequent to the completion of the polymerization reaction of the monovinylaromatic and terpene monomers, if the product contains residual unsaturated or olefinic bonds these double may be further reacted either partially or entirely according to the procedures in U.S. Pat. No. 5,158,851 filed Sep. 24, 1990 and U.S. Pat. No. 5,278,016 filed May 6, 1991, the disclosures of which are incorporated herein in their entirety.

The amount of terpene in the copolymers can in embodiments be from about 5% to 30% with the preferred range being from about 13% to about 25%. The term "terpene" as used herein refers to a hydrocarbon having at least one unsaturation of the type C=C, having at least an empirical formula containing $C_{10}H_{14}$, and may be acyclic or cyclic with one or more benzenoid groups, and includes oxygenated unsaturated terpene derivatives, such as carvone.

The glass transition temperature ($T_g$) measured using known melt rheometric means of the toner resins of the present invention can be from about 35° C. to about 65° C. with weight average molecular weights ($M_w$) being from about 35,000 to about 150,000 and number average molecular weights ($M_n$) of from about 15,000 to about 40,000. The amount of the resin in the toner is generally from about 80% to about 96% with the preferred range being from about 90% to about 94%.

In another embodiment of the present invention there is provided subsequent to known micronization and classification toner particles with an average diameter of from about 10 to about 20 microns comprised of styrene terpene copolymer resin particles, pigment particles, and charge enhancing additives comprised of quaternary ammonium bisulfates, tetraalkyl ammonium sulfonates, mixtures thereof, and the like.

Examples of specific bisulfate charge enhancing additives are trialkyl hydrogen ammonium bisulfate such as distearyl methyl hydrogen ammonium bisulfate, trimethyl hydrogen ammonium bisulfate, triethyl hydrogen ammonium bisulfate, tributyl hydrogen ammonium bisulfate, dioctyl methyl hydrogen ammonium bisulfate, didodecyl methyl hydrogen ammonium bisulfate, dihexadecyl methyl hydrogen ammonium bisulfate, and the like; and preferably in an embodiment distearyl methyl hydrogen ammonium bisulfate. Examples of tetraalkyl ammonium sulfonate charge additives include distearyl dimethyl ammonium methyl sulfonate, tetramethyl ammonium methyl sulfonate, tetramethyl ammonium trifluoromethyl sulfonate, tetrabutyl ammonium methyl sulfonate, tetrabutyl ammonium trifluoromethyl sulfonate, dioctyl dimethyl ammonium methyl sulfonate, dioctyl dimethyl ammonium trifluoromethyl sulfonate, didodecyl dimethyl ammonium methyl sulfonate, didodecyl dimethyl ammonium trifluoromethyl sulfonate, dihexadecyl dimethyl ammonium methyl sulfonate, dihexadecyl dimethyl ammonium trifluoromethyl sulfonate, and the like; and preferably distearyl methyl hydrogen ammonium bisulfate, or distearyl dimethyl ammonium trifluoromethyl sulfonate, Other preferred charge enhancing additives of the instant invention present in an amount of from about 0.1 to about 10 percent by weight are alkyl pyridinium halides, organic sulfates, organic bisulfates, organic sulfonates, distearyl dimethyl ammonium methyl sulfate, distearyl dimethyl ammonium bisulfate, cetyl pyridinium lakes, polyvinyl pyridine, treated carbon blacks, tetraphenyl borate salts, phosphonium salts, nigrosine, metal-salicylate salts, metal complexes, polystyrene-polyethylene oxide block copolymer salt complexes, poly(dimethyl amino methyl methacrylate), metal azo dye complexes, organo-aluminum salts, Aerosils ®, and zinc stearate.

The toner compositions of the present invention can be prepared by a number of known methods such as admixing and heating resin particles such as styrene terpene copolymers, like styrene-myrcene copolymers, pigment particles such as magnetite, carbon black, or mixtures thereof, and preferably from about 0.5 percent to about 5 percent of the aforementioned charge enhancing additives, or mixtures of charge additives, in a toner extrusion device, such as the ZSK53 available from Werner Pfleiderer, and removing the formed toner composition from the device, Subsequent to cooling, the toner composition is subjected to grinding utilizing, for example, a Sturtevant micronizer for the purpose of achieving toner particles with a volume median diameter of less than about 25 microns, and preferably of from about 8 to about 12 microns, which diameters are determined by a Coulter Counter. Subsequently, the toner compositions can be classified utilizing, for example, a Donaldson Model B classifier for the purpose of removing fines, that is toner particles less than about 4 microns volume median diameter. The toners of the present invention can also be prepared with in a Haalce blender illustrated herein.

Illustrative examples of suitable second toner resins that may be mixed or blended with the monovinyl aromatic terpene copolymer resins include polyamides, polyolefins, styrene acrylates, styrene methacrylate, styrene butadienes, crosslinked styrene polymers, epoxies, polyurethanes, vinyl resins, including homopolymers or copolymers of two or more vinyl monomers; and polymeric esterification products of a dicarboxylic acid and a diol comprising a diphenol. Monovinyl aromatic toohomers include styrene, p-chlorostyrene, monoalkyl-monovinyl aromatics such as ethylene, propylene, butylene, isobutylene and the like substituted toluenes; mixtures thereof; and the like. As one toner resin suitable for blending with the monovinyl aromatic-terpene copolymers, there are selected the esterification products of a dicarboxylic acid and a diol comprising a diphenol. These resins are illustrated in U.S. Pat. No. 3,590,000, the disclosure of which is totally incorporated herein by reference. Other specific toner resins include styrene/methacrylate copolymers, and styrene/butadiene copolymers; Pliolites; suspension polymerized styrene butadienes, reference U.S. Pat. No. 4,558,108, the disclosure of which is totally incorporated herein by reference; polyester resins obtained from the reaction of bisphenol A and propylene oxide; followed by the reaction of the resulting product with fumaric acid, and branched polyester resins resulting from the reaction of dimethylterephthalate, 1,3-butanediol, 1,2-propanediol, and pentaerythritol, styrene acrylates, and mixtures thereof. Also, waxes with a molecular weight of from about 1,000 to about 6,000 such as polyethylene, polypropylene, and paraffin waxes can be included in, or on the toner compositions as fuser roll release agents.

The copolymer styrene-terpene resin particles are present in a sufficient, but effective amount, for example from about 80 to about 96 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive of the present invention is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black, like REGAL 330 ®, and other similar known carbon blacks available for example from a number of sources, such as Cabot Corporation, nigrosine dye, aniline blue, magnetite, or mixtures thereof. The pigment should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles may be selected.

In those instances when the pigment particles are comprised of magnetites, thereby enabling single component toners in some instances, which magnetites are a mixture of iron oxides ($FeO$-$Fe_2O_3$) including those commercially available as Mapico Black, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as Mapico Black, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas such as AEROSIL R972 ®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas such as AEROSIL ®R972, available from Degussa, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions of the present invention low molecular weight waxes, such as polypropylenes and polyethylenes, commercially available from Allied Chemical and Petrolite Corporation, Epolene N-15 commercially available from Eastman Chemical Products, Inc., Viscol 550-P, a low weight average molecular weight polypropylene available from Sanyo Kasei K. K., and similar materials. The commercially available polyethylenes selected have a molecular weight of from about 1,000 to about 1,500, while the commercially available polypropylenes utilized for the toner compositions of the present invention are believed to have a molecular weight of from about 3,000 to about 7,000. Many of the polyethylene and polypropylene compositions useful in the present invention are illustrated in British Patent No. 1,442,835, the disclosure of which is totally incorporated herein by reference.

The low molecular weight wax materials are present in the toner composition of the present invention in various amounts, however, generally these waxes are present in the toner composition in an amount of from about 1 percent by weight to about 15 percent by weight, and preferably in an amount of from about 2 percent by weight to about 10 percent by weight.

Moreover, encompassed within the scope of the present invention are colored toner and developer compositions comprised of the styrene terpene copolymer toner resin particles, optional carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with the charge enhancing additives of the present invention, illustrative examples of magenta materials that may be selected as pigments include, for example, 2, 9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles of the present invention can be selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. Nos. 3,526,533 and 3,467,634, the disclosures of which are totally incorporated herein by reference; polymethyl methacrylates; other known coatings; and the like. The carrier particles may also include in the coating, which coating can be present in one embodiment in an amount of from about 0.1 to about 3 weight percent, conductive substances such as carbon black in an amount of from about 5 to about 30 percent by weight, Polymer coatings not in close proximity in the triboelectric series can also be selected, reference copending applications U.S. Ser. No. 136,791, and U.S. Ser. No. 136,792, the disclosures of which are totally incorporated herein by reference, including, for example, Kynar and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 and preferably are about 175 microns thereby permitting them to possess sufficient density and inertia to avoid adherence to the electrostatic images during the development process. The carrier component can be mixed with the toner composition in various suitable combinations, such as from about 1 to 5 parts per toner to about 100 parts to about 200 parts by weight of carrier are selected.

The toner composition of the present invention can be prepared by a number of known methods including extrusion melt blending the toner resin particles, pigment particles or colorants, and the optional charge enhancing additive of the present invention as indicated herein, followed by mechanical attrition and classification. Other methods include those well known in the art such as spray drying, melt dispersion, extrusion processing, dispersion polymerization, and suspension polymerization. Also, as indicated herein the toner composition without the charge enhancing additive can be prepared, followed by the addition of surface treated with charge additive colloidal silicas. Further, other methods of preparation for the toner are as illustrated herein. Thereafter, surface additives may be blended with the toner.

The toner and developer compositions of the present invention may be selected for use in electrostatographic imaging apparatuses containing therein conventional photoreceptors such as those that are capable of being charged negatively. Thus, the toner and developer compositions of the present invention can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys. Other similar photoreceptors can be selected providing the objectives of the present invention are achievable.

The toner compositions are usually jetted and classified subsequent to preparation to enable toner particles with a preferred average diameter of from about 5 to about 25 microns, and more preferably from about 8 to about 12 microns. Also, the toner compositions of the present invention preferably possess a triboelectric charge of from about 0.1 to about 3 femtocoulombs per micron in embodiments thereof as determined by the known charge spectograph. Admix time for the toners of the present invention are preferably from about 30 seconds to I minute, and, more specifically, from about 5 to about 15 seconds in embodiments thereof as determined by the known charge spectrograph. These toner compositions with rapid admix characteristics enable, for example, the development of images in electrophotographic imaging apparatuses, which images have substantially no background deposits thereon, even at high toner dispensing rates in some instances, for example, exceeding 20 grams per minute; and further, such toner compositions can be selected for high speed electrophotographic apparatuses, that is those exceeding 70 copies per minute.

The following examples are being supplied to further define various species of the present invention, it being noted that these examples are intended to illustrate and not limit the scope of the present invention. Parts and percentages are by weight unless otherwise indicated.

EXAMPLE I

Preparation of Styrene Myrcene Copolymer Resin by Suspension Polymerization

A suspension of 3.0 grams tricalcium phosphate (TCP) in a solution of 0.0048 g Alkanol, a naphthalene sulfonate, available from E. I. duPont deNemours & Co., in water (100 mL) was added to a modified Parr reactor having a void volume of 300 mL. The reactor was purged with nitrogen and heated to 95° C. over a period of 40 minutes. A solution of styrene (46.8 g), 80% pure myrcene (13.2 g), benzoyl peroxide (5.0 g) and O,O-t-amyl-(2-ethylhexyl)monoperoxycarbonate (0.2 mL) was added to the reactor and the reaction was allowed to proceed at 95° C. for 192 minutes. The temperature of the reaction was increased to 125 ° C. over 40 minutes and maintained at 125° C. for 1 hour. After cooling the reactor to room temperature, about 25 degrees Centigrade, the reactor was opened and the resulting resins beads were removed, washed with 8 mL of concentrated nitric acid, followed by washing with distilled water. The resins beads were dried over night, about 18 hours, under vacuum at 40° C. The product was subsequently precipitated from toluene into methanol to remove any impurities such as Ψ-limonene, 1-limonene and various Dieis-Alder adducts of myrcene, that originated from the 80% purity myrcene monomer. The resulting copolymer resin, poly (styrene myrcene), had a $T_g$ of 48° C. with a $M_n=8,700$ and a $M_w=38,900$ and a polydispersity of about 4.5 as determined by gel permeation chromatography with Ultrastyragel columns, manufactured by Millipore Waters, calibrated with polystyrene as molecular weight standards.

EXAMPLE II

Preparation of Styrene Myrcene Copolymer Resin by Anionic Polymerization

A copolymer of styrene and myrcene was synthesized by an anionic polymerization process. The reaction was performed under argon with all dried reagents. To a dry 1 liter reactor was added cyclohexane (180 mL), sec-butyllithium (10.1 retool) and 1,3-diisopropenylbenzene (0.90 mL, 5.1 retool), while maintaining a positive pressure of argon in the system. The stirring rate was increased to approximately 400 rpm and the pressure was dropped to about 0.04 bar by allowing the argon to escape through a bubbler. The reactor was heated to 50° C. and held at this temperature for 4 hours. The reactor was pressurized to about 0.3 bar and 150 mL tetrahydrofuran (THF) was added via syringe. The stirring rate was increased to 700 rpm. The reaction mixture was cooled to between $-5°$ C. and $-10°$ C. and a solution of styrene (75.1 g, 0.72m) and myrcene (25.2 g, 0.185m) in 130 mL of dry cyclohexane was added at a rate such that the temperature of the reaction mixture did not exceed 5° C. Monomer addition was usually complete in approximately 35 minutes. The reaction mixture was heated to 30 ° C. for about 1.5 hours and then quenched with methanol. The polymer was precipitated in a mixture of isopropanol (2,750 mL) and methanol (500 mL) to yield, after filtration and drying, a fine white powder. The yield was 96%. The $T_g$ of the resin was 60° C. with $Mn=36,000$ and $M_w=64,000$ determined as described in Example I.

There was prepared, in a Haalce blender device, a toner composition by adding thereto 92 percent by weight of styrene myrcene copolymer resin particles (75:25) as obtained from Example II, 6 percent by weight of Regal 330 ® carbon black; and 2 percent by weight of the charge enhancing additive cetyl pyridinium chloride. The toner product was heated at 130° C. for 15 minutes with mixing at 100 r.p.m. The toner was removed micronized and jetted to provide toner particles with an average diameter of about 11 microns.

Subsequently, the above formulated toner, 3 parts by weight, was mixed with 97 parts by weight of a carrier containing a steel core with a polymer mixture thereof, 0.70 percent coating weight, which polymer mixture contained 40 parts by weight of polyvinylidene fluoride, and 60 parts by weight of polymethyl methacrylate, and wherein mixing was accomplished in a paint shaker for 10 minutes, There resulted on the toner composition, as determined in the known Faraday Cage apparatus, a positive triboelectric charge of 24 microcoulombs per gram.

The above prepared toner had a triboelectric charge of 20 microcoulombs per gram, and an admix time of 0.5 minute. The advantage of using tarpenes as a comonomer in toner resin preparation is that the tarpenes are easier to handle than gaseous and toxic butadiene. The tarpenes are relatively non-toxic liquids, In addition, the terpenes are derived from renewable natural resources, For example, myrcene is derived from turpentine which is a by-product of sulphite wood-pulping processing. The advantages of the toners are that one can put more tarpane in the toner resin than butadiene thus reducing the relative amount of styrene in the resin. This in turn reduces the brittleness of the toner. The toner was fused on the Xerox Corporation 1075 TM xerographic imaging test fixture yielding prints of excellent exhibiting no background and the prints were dark and sharp. The minimum fix temperature was 150° C. with a fusing latitude of 30° C., as determined by the aforementioned crease test. This compares favorably with the Xerox 5090 TM toner which has a minimum fix temperature of 155° C. and a fusing latitude of greater than 30° C.

Other modifications of the present invention may occur to those skilled in the art subsequent to a review of the present application, and these modifications, including equivalents thereof, are intended to be included within the scope of the present invention.

What is claimed is:

1. A toner composition comprised of pigment particles and monovinyl aromatic and terpene random copolymer resin particles wherein the terpene content of the copolymer is from about 5 to about 30 weight percent.

2. A toner composition in accordance with claim 1 wherein the pigment particles are carbon black, magnetites, or mixtures thereof, cyan, magenta, yellow, red, blue, green, brown, and mixtures thereof.

3. A toner composition in accordance with claim 1 with a melting temperature of from about 130° C. to about 155° C.

4. A developer composition comprised of the toner composition of claim 1 and carrier particles.

5. A developer composition in accordance with claim 4 wherein the carrier particles are comprised of ferrites, steel, or an iron powder.

6. A developer composition in accordance with claim 4 wherein the carrier particles are comprised of a core with a polymer coating thereover.

7. A method of imaging which comprises formulating an electrostatic latent image on a photoreceptor, affecting development thereof with the toner composition of claim 1, and thereafter transferring the developed image to a suitable substrate.

8. A toner composition in accordance with claim 1 wherein the monovinyl aromatic terpene copolymer is selected from the group consisting of styrene myrcene, styrene alpha-pinene, styrene ocimene and styrene carvone.

9. A toner composition comprised of a styrene and terpene random copolymer resin and pigment wherein the terpene content of the copolymer is from about 5 to about 30 weight percent.

10. A toner composition in accordance with claim 9 further containing a charge enhancing additive.

11. A toner composition in accordance with claim 10 wherein the charge enhancing additive is present in an amount of from about 0.1 to about 10 percent by weight and is selected from the group consisting of distearyl methyl hydrogen ammonium bisulfate, didodecyl methyl hydrogen ammonium bisulfate, dihexadecyl methyl hydrogen ammonium bisulfate, distearyl ethyl hydrogen ammonium bisulfate, bis-(distearyl methyl hydrogen ammonium) sulfate, distearyl dimethyl ammonium methyl sulfonate, distearyl dimethyl ammonium trifluoromethyl sulfonate, didodecyl dimethyl ammonium methyl sulfonate, dihexadecyl methyl hydrogen ammonium methyl sulfonate, didodecyl trifluoromethyl hydrogen ammonium methyl sulfonate, dihexadecyl methyl hydrogen ammonium trifluoromethyl sulfonate, tris-trifluoromethyl hydrogen ammonium methyl sulfonate, distearyl diethyl ammonium ethyl sulfonate, alkyl pyridinium halides, organic sulfates, organic bisulfates, organic sulfonates, distearyl dimethyl ammonium methyl sulfate, distearyl dimethyl ammonium bisulfate, cetyl pyridinium lakes, polyvinyl pyridine, treated carbon blacks, tetraphenyl borate salts, phosphonium salts, nigrosine, metal-salicylate salts, metal complexes, polystyrene-polyethylene oxide block copolymer salt complexes, poly(dimethyl amino methyl methacrylate), metal azo dye complexes, organoaluminum salts, colloidal silicas, and zinc stearate.

12. A toner composition in accordance with claim 11 wherein the charge additive is incorporated into the toner.

13. A toner composition in accordance with claim 11 wherein the charge additive is present on the surface of the toner composition.

14. A toner composition in accordance with claim 9 wherein the charge additive is present in an amount of from about 0.05 to about 5 weight percent.

15. A toner composition in accordance with claim 9 further containing a wax component with a weight average molecular weight of from about 1,000 to about 6,000.

16. A toner composition in accordance with claim 15 wherein the waxy component is selected from the group consisting of polyethylene and polypropylene.

17. A toner composition in accordance with claim 9 with a glass transition temperature ($T_g$) of from about 35° C. to 65° C.

18. A toner composition in accordance with claim 9 with a styrene terpene copolymer resin weight average molecular weight ($M_w$) of from about 35,000 to 150,000 and number average molecular weight ($M_n$) of from about 15,000 to about 40,000.

19. A toner composition in accordance with claim 9 further comprising a second resin blended or mixed with the styrene terpene copolymer resin.

20. A toner composition comprised of a styrene and myrcene random resin copolymer and pigment wherein the myrcene content of the copolymer is from about 5 to about 30 weight percent.

21. A toner composition in accordance with claim 20 further containing as external additives metal salts of a fatty acid, colloidal silicas, or mixtures thereof.

* * * * *